United States Patent
Miyata

(10) Patent No.: US 7,893,959 B2
(45) Date of Patent: Feb. 22, 2011

(54) VIDEO DISPLAY SYSTEM FOR CORRECTING THE POSITION AND SIZE OF MASK IMAGES

(75) Inventor: Kazunori Miyata, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1715 days.

(21) Appl. No.: 10/347,865

(22) Filed: Jan. 22, 2003

(65) Prior Publication Data
US 2003/0137589 A1 Jul. 24, 2003

(30) Foreign Application Priority Data
Jan. 22, 2002 (JP) .............................. 2002-012909
Jan. 22, 2002 (JP) .............................. 2002-012912

(51) Int. Cl.
H04N 7/18 (2006.01)
H04N 5/225 (2006.01)
H04N 5/262 (2006.01)

(52) U.S. Cl. ................... 348/153; 348/207.99; 348/239

(58) Field of Classification Search ................. 348/143, 348/152, 153, 207.99, 222.1, 239
See application file for complete search history.

(56) References Cited

U.S. PATENT DOCUMENTS

| | | | |
|---|---|---|---|
| 5,808,670 A * | 9/1998 | Oyashiki et al. | 348/143 |
| 5,949,431 A * | 9/1999 | Matsumura et al. | 345/635 |
| 6,055,014 A * | 4/2000 | Hosonuma et al. | 348/143 |
| 6,208,379 B1 * | 3/2001 | Oya et al. | 348/211.11 |
| 6,509,926 B1 * | 1/2003 | Mills et al. | 348/143 |
| 6,744,461 B1 * | 6/2004 | Wada et al. | 348/143 |
| 2003/0103139 A1 * | 6/2003 | Pretzer et al. | 348/143 |
| 2003/0227555 A1 * | 12/2003 | Kobayashi et al. | 348/231.6 |

FOREIGN PATENT DOCUMENTS

| | | |
|---|---|---|
| JP | 2001-061137 | 3/2001 |
| JP | 2001-069494 | 3/2001 |

* cited by examiner

Primary Examiner—Timothy J Henn
(74) Attorney, Agent, or Firm—Westerman, Hattori, Daniels & Adrian, LLP

(57) ABSTRACT

An OSD circuit superimposes a mask image on a video imaged by a camera main body in a camera device. A microcomputer performs processing for changing the position where a mask image is displayed (superimposed) within a range of imaging with the camera device on the basis of a signal representing the pan/tilt position of the camera device. At this time, when the mask image is moved in the pan direction from an area where the initial position of the mask image is set, the position and the size of the mask image are corrected depending on the amount of movement of the mask image and the tilt angle of the camera device.

5 Claims, 10 Drawing Sheets

Fig. 3
(a) 0°
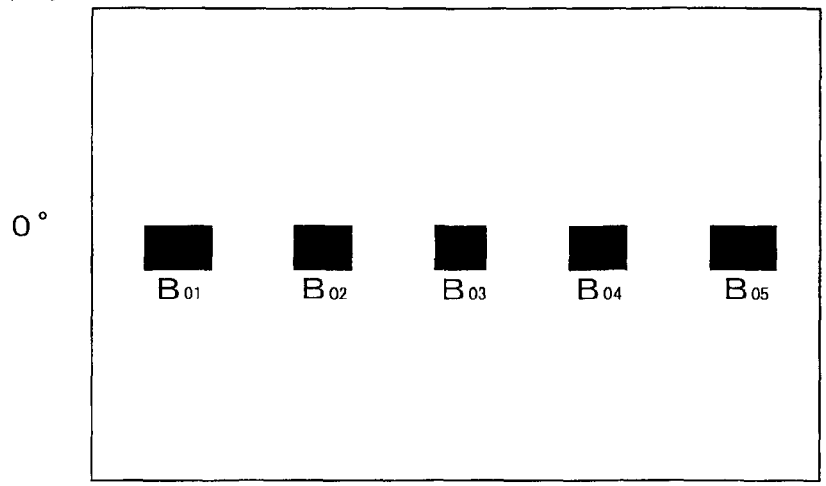
(b) 20°
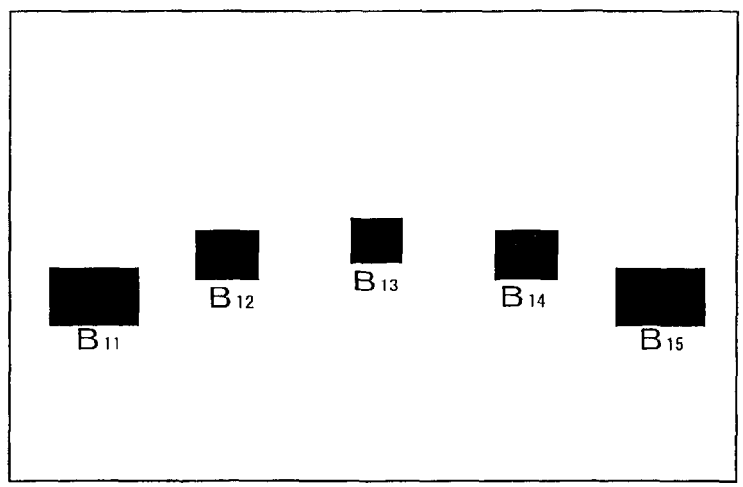
(c) 40°
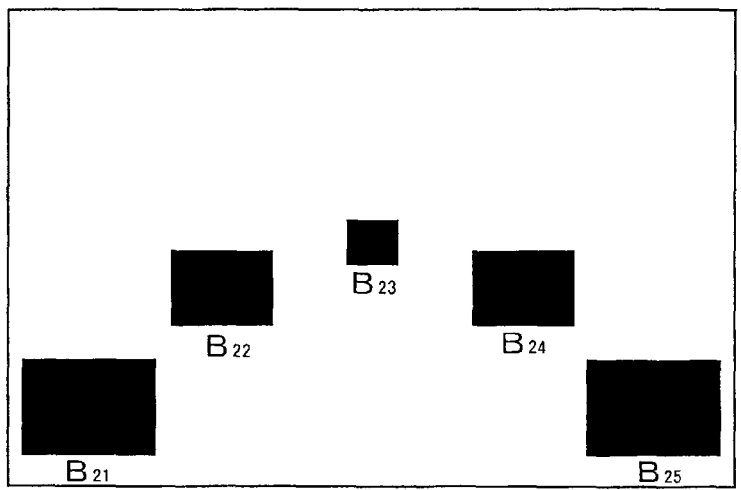

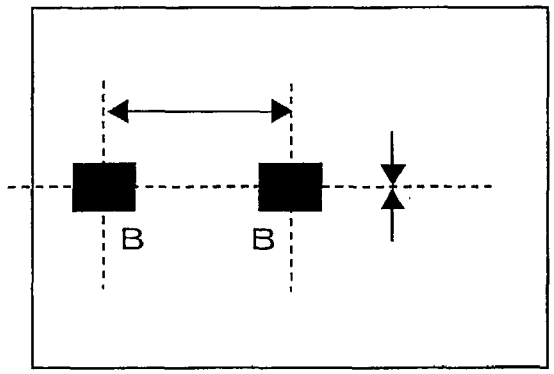

MOVE BY PRDETERMINED AMOUNT
IN PAN DIRECTION
WHEN TILT ANGLE = 0°

NO POSITION CORRECTION
IN PAN DIRECTION

NO POSITION CORRECTION
IN TILT DIRECTION (b)

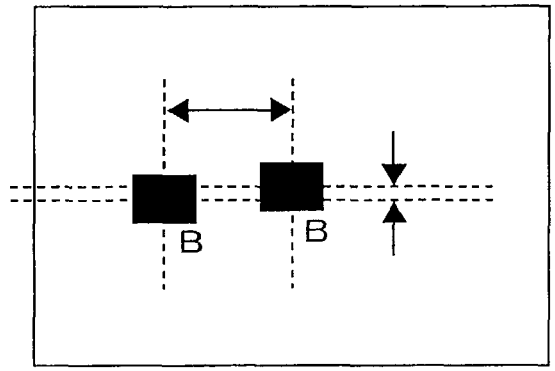

MOVE BY PRDETERMINED AMOUNT
IN PAN DIRECTION
WHEN TILT ANGLE = 10°

POSITION CORRECTION
IN PAN DIRECTION

POSITION CORRECTION
IN TILT DIRECTION (c)

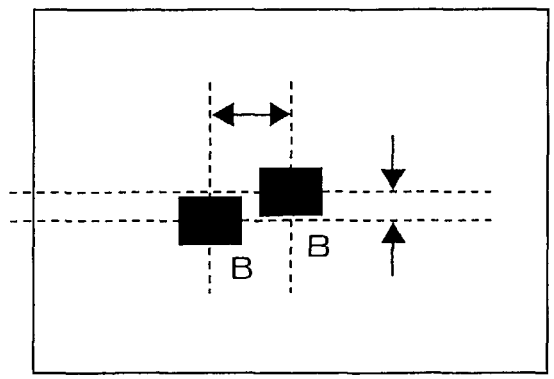

MOVE BY PRDETERMINED AMOUNT
IN PAN DIRECTION
WHEN TILT ANGLE = 20°

POSITION CORRECTION
IN PAN DIRECTION

POSITION CORRECTION
IN TILT DIRECTION

VIDEO DISPLAY SYSTEM FOR CORRECTING THE POSITION AND SIZE OF MASK IMAGES

BACKGROUND OF THE INVENTION

Field of the Invention

The present invention relates to a video camera system utilized as a monitoring camera or the like.

Many of video camera systems comprise a panning/tilting mechanism such that the direction of imaging is freely changeable. Further, video camera systems comprising a privacy masking function are also provided. The privacy masking function is the function of masking, when an arbitrary area is not desired to be seen by other persons within a range of imaging with a camera, the area. The masking is performed by overlapping a mask image on an imaged video.

When the direction of imaging is changed by the panning/tilting mechanism so that a mask object in the video is moved on a screen, the position where the mask image is displayed must be changed. Specifically, in a case where a camera 11 is put at a position indicated by a solid line, as shown in FIG. 9 (*a*), if a mask object A exists, as illustrated, the mask object A is displayed on a screen of a monitor 12, as shown in FIG. 9 (*b*). In this state, the initial position of a mask image B is set. When the camera 11 is subjected to a tilting operation, as indicated by a dotted line in FIG. 9 (*a*), the mask object A is moved upward on the screen of the monitor 12, as shown in FIG. 9 (*c*). Consequently, processing for moving the mask image B upward on the screen is also performed depending on the tilting operation.

Only when the position where the mask image B is displayed is changed upward or downward on the screen or is changed rightward or leftward on the screen on the basis of the position of the camera 11 by panning/tilting, however, the mask object A may seem it protruded from the mask image B.

Furthermore, as shown in FIG. 10 (*a*), a maximum of four mask images B can be set in a first camera direction indicated by a solid line (see FIG. 10 (*b*)), and a maximum of four mask images B can be similarly set even in a second camera direction indicated by a dotted line (see FIG. 10 (*c*)).

In a case where the four mask images B are set at each of first and second ranges of imaging with the camera 11, as described above (that is, in a case where a total of eight mask objects A exist), when a panning operation is performed, however, there may occur a state where all the eight mask objects A enter the ranges of imaging with the camera 11 (see a double-framed portion extending over FIGS. 10 (*b*) and 10 (*c*)). Since the maximum number of mask images B which can be set is four, all the eight mask objects A cannot be masked.

In the above-mentioned case, when the panning operation is performed from the state shown in FIG. 10 (*b*) to the state shown in FIG. 10 (*c*), for example, there arise situations where the four mask objects A set in the first camera direction are masked and the four mask objects A set in the second camera direction are not masked.

SUMMARY OF THE INVENTION

In view of the foregoing situations, an object of the present invention is to provide a video camera system capable of avoiding situations where a mask object seems it protruded from a mask image to the utmost and capable of preventing situations where an important mask object is not masked when the number of mask images which can be set is restricted.

In order to solve the above-mentioned problem, in a video camera system capable of carrying out tilt control of a camera device and capable of displaying a video imaged by the camera device on a monitor as well as superimposing a mask image on an arbitrary area within a range of imaging with the camera device, the video camera system according to the present invention is characterized in that in a case where the mask image is moved in the tilt direction from an area where the initial position of the mask image is set, the vertical length on a screen of the mask image is corrected depending on the amount of movement thereof.

In a video camera system capable of carrying out pan control of a camera device and capable of displaying a video imaged by the camera device on a monitor as well as superimposing a mask image on an arbitrary area within a range of imaging with the camera device, the video camera system according to the present invention is characterized in that in a case where the mask image is moved in the pan direction from an area where the initial position of the mask image is set, the horizontal length on a screen of the mask image is corrected depending on the amount of movement thereof.

In a video camera system capable of carrying out panning/tilting control of a camera device and capable of displaying a video imaged by the camera device on a monitor as well as superimposing a mask image on an arbitrary area within a range of imaging with the camera device, the video camera system according to the present invention is characterized in that in a case where the mask image is moved in the pan direction from an area where the initial position of the mask image is set, the position of the mask image is corrected depending on the amount of movement of the mask image and the tilt angle.

The size of the mask image may be corrected in addition to the correction of the position thereof.

In a video camera system capable of carrying out panning/tilting control of a camera device and capable of displaying a video imaged by the camera device on a monitor as well as superimposing a mask image on an arbitrary area within a range of imaging with the camera device, the video camera system according to the present invention is characterized in that in a case where the mask image is moved, the size of the mask image is greatly corrected both forward and backward or either forward or backward in the direction of movement depending on the movement speed thereof.

In a video camera system capable of carrying out panning/tilting control of a camera device and capable of displaying a video imaged by the camera device on a monitor as well as superimposing a mask image on an arbitrary area within a range of imaging with the camera device, the video camera system according to the present invention is characterized in that in a case where the mask image is moved, the position of the mask image is corrected in the direction of movement depending on the movement speed thereof in view of the fact that the camera device is also moved during processing for calculating the amount of movement of the mask image.

In a configuration for correcting the mask image at the time of the movement thereof, the amount of correction of the mask image may be adjusted depending on the movement speed thereof.

In a video camera system capable of carrying out panning/tilting control of a camera device and capable of displaying a video imaged by the camera device on a monitor as well as superimposing a mask image on an arbitrary area within a range of imaging with the camera device, the video camera system according to the present invention is characterized in that in a state where it images an area including the original mask object by being reversed in the tilt direction and also reversed in the pan direction from an area where the initial position of the mask image is set, the size of the mask image is greatly corrected.

In order to solve the above-mentioned problem, in a video camera system capable of carrying out panning/tilting control of a camera device, capable of displaying a video imaged by the camera device on a monitor as well as superimposing a maximum of n (n is a natural number of one or more) mask images within a range of imaging with the camera device, and capable of similarly superimposing a maximum of n mask images even within a range of imaging with the camera device at the time of imaging in another direction, the video camera system according to the present invention is characterized by comprising means for setting priorities in the mask images.

In the above-mentioned configuration, in the case where n or more mask objects enter the range of imaging with the camera device, all the mask objects cannot be masked. However, it is possible to perform processing for masking n mask objects whose degree of importance is high by priority on the basis of the priorities set in the mask images, thereby making it possible to prevent situations where the mask objects whose degree of importance is high are not masked.

In a case where mask object areas whose number exceeds n exist within the range of imaging with the camera device, n mask images may be selected in conformity with the priorities.

The mask images may be subjected to display judgment processing in the order of descending priorities within the range of imaging with the camera device, to perform display processing with respect to the mask image to be displayed and not further perform display processing with respect to the mask image when the number of displayed mask images is n.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 (*b*) is an explanatory view showing that the track of a mask object is linearly formed in the lateral direction on a screen;

FIG. 2 (*c*) is an explanatory view showing that the track of a mask object is formed in a circular shape;

FIGS. 3 (*a*) to 3 (*b*) are explanatory views respectively showing the contents of correction of the display of a mask image;

FIGS. 4 (*a*) to 4 (*b*) are explanatory views respectively showing the contents of correction of the display of a mask image;

FIG. 6 (*b*) is an explanatory view showing a case where the position during movement of a mask image is corrected;

FIG. 9 (*b*) is an explanatory view showing a mask object and a mask image at an initial position; and FIG. 9 (*c*) is an explanatory view showing the position of the mask object, and mask image subject to a tilting operation.

FIGS. 10(*b*) and 10(*c*) are explanatory views showing that a maximum of four mask images can be set in a first camera direction and second camera direction, respectively.

DESCRIPTION OF THE PREFERRED EMBODIMENTS

A video camera system according to an embodiment of the present invention will be described on the basis of FIGS. 1 to 8.

Figure 1:
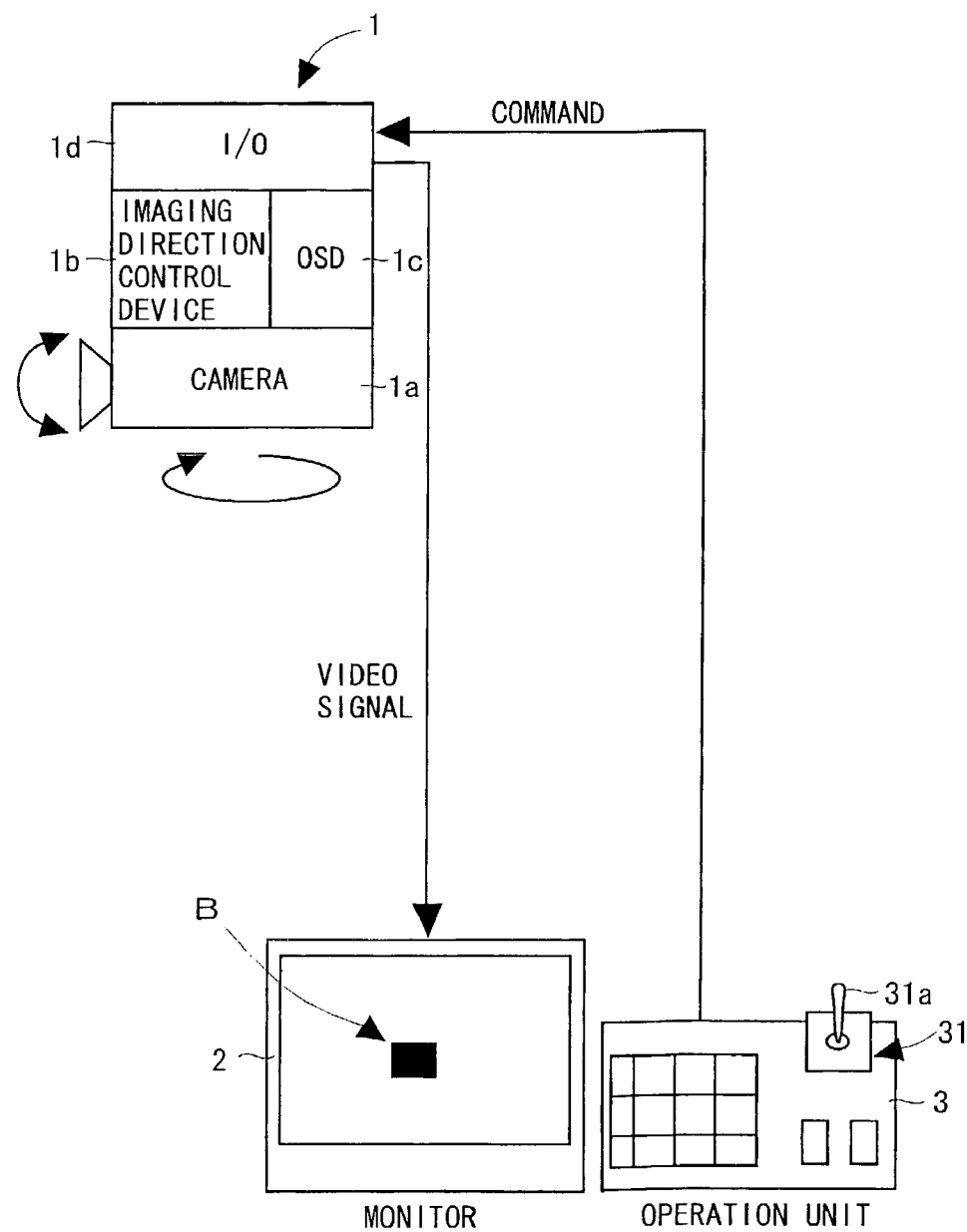
FIG. 1 is an explanatory view showing a video camera system according to the present invention.

FIG. 1 is a block diagram showing a video camera system according to the present embodiment. A camera device 1 comprises a camera main body 1*a*, an imaging direction control device (a panning/tilting mechanism) 1*b*, an OSD (On-Screen Display) circuit 1*c*, and an I/O interface 1*d*. Each of the constituent elements is controlled by a microcomputer (not shown). A video imaged by the camera main body 1a is subjected to video processing such as gamma correction, is then converted into a composite video signal based on NTSC (National Television System Standard Committee) or the like, and is fed to a monitor 2.

The imaging direction control device 1*b* is a device for carrying out panning/tilting control in the camera main body 1*a*, and comprises an actuator such as a motor (not shown). A driving control signal to the actuator in the imaging direction control device 1*b* is fed from the microcomputer. The microcomputer receives a pan/tilt command from an operation unit 3 through the I/O interface 1*d*, to generate the driving control signal on the basis of the command.

The OSD circuit 1*c* is a circuit for superimposing a menu item, a mask image, etc. on the video imaged by the camera main body 1*a*. The microcomputer receives a mask display command, etc. from the operation unit 3 through the I/O interface 1*d*, to control the OSD circuit 1*c* on the basis of the command. Further, the microcomputer performs processing for changing (moving) the position where the mask image is displayed (superimposed) on the basis of a signal representing the pan/tilt position of the camera device 1. A potentiometer for changing a voltage value depending on the rotation of the camera device 1, for example can be used as a signal representing the pan/tilt position of the camera device 1.

The monitor 2 receives a video signal from the camera device 1 by a video cable, for example, to display a video on its screen. When a mask image B is superimposed on the imaged video by the OSD circuit 1*c*, the mask image B is displayed on the screen of the monitor 2, as illustrated in FIG. 1.

The operation unit 3 comprises various types of keys and a joystick 31, and so on. The joystick 31 has a first rotatable member and a second rotatable member in a cross shape, for example. The joystick 31 comprises a first volume and a second volume. The axis of rotation of the first volume is connected to the axis of rotation of the first rotatable member, and the axis of rotation of the second volume is connected to the axis of rotation of the second rotatable member. A stick 31*a* is provided so as to respectively rotate the first rotatable member and the second rotatable member by being operated.

If the stick 31a is operated forward or backward, rightward or leftward, or obliquely by such a configuration, the respective resistance values of the first volume and the second volume are changed, thereby making it possible to detect the direction of operation and the degree of inclination of the stick 31a by the changes in voltages based on the changes in the resistance values.

The operation unit 3 samples the direction of operation and the degree of inclination of the stick 31a (voltages by the first and second volumes) at predetermined intervals, to produce a pan/tilt command having a directional component and a speed component and feed the command to the camera device 1. The microcomputer in the camera device 1 receives the pan/tilt command, to control the imaging direction control device (panning/tilting mechanism) 1b.

Figure 2:
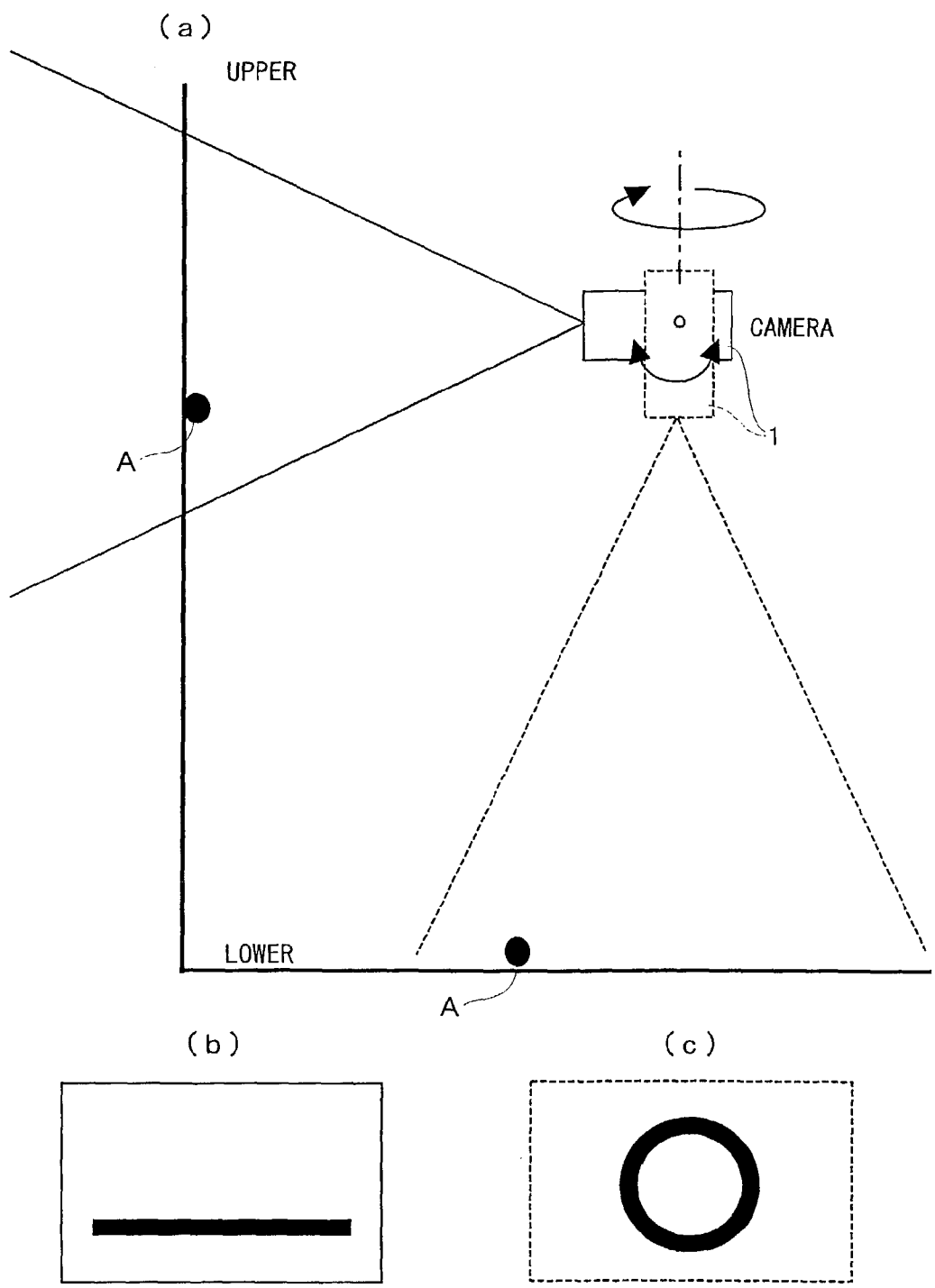
FIG. 2 (*a*) is an explanatory view showing the direction of imaging with a camera device.

When the direction of imaging is changed by the panning/tilting mechanism so that a mask object A in the video is moved within a range of imaging with the camera device 1 (on the screen of the monitor 2), the position where the mask image B is displayed is changed. When a panning operation is performed in a state where the camera device 1 is indicated by a solid line (a tilt angle 0°: a horizontal state), as shown in FIG. 2 (a) however, the track of the mask object A is linearly formed in the lateral direction on the screen, as shown in FIG. 2 (b). On the other hand, when a panning operation is performed in a state where the camera device 1 is indicated by a dotted line (a tilt angle 90°) in FIG. 2 (a), the track of the mask object A is formed in a circular shape, as shown in FIG. 2 (c). When a panning operation is performed in a state where the camera device 1 is intermediate therebetween (e.g., a tilt angle 40°), the track of the mask object A is formed in a circular arc shape.

FIG. 3 is a diagram showing the change in the display of the mask image B in a case where the panning operation is performed, where FIG. 3 (a) illustrates a case where the tilt angle is 0°, FIG. 3 (b) illustrates a case where the tilt angle is 20°, and FIG. 3 (c) illustrates a case where the tilt angle is 40°.

In FIG. 3 (a), the tilt angle is 0°. When the panning operation is performed, therefore, the mask object A is linearly moved in the lateral direction on the screen. The mask image B is linearly moved in the lateral direction on the screen from an area (B03) where the initial position is set. However, the horizontal length on the screen of the mask image B is corrected depending on the amount of movement thereof. For example, a mask image B04 next to the mask image B03 at the initial position is more greatly corrected by approximately 5%, as compared with the mask image B03 (the amount of correction of the mask image differs depending on the amount of movement thereof).

In FIG. 3 (b), the tilt angle is 20°. When the panning operation is performed, therefore, the mask object A is moved in a circular arc shape. In order to correspond to the movement in a circular arc shape, therefore, the position of the mask image B is corrected in the longitudinal direction on the screen depending on the amount of movement thereof in the lateral direction on the screen by the panning operation (the position thereof in the lateral direction on the screen is also corrected depending on the tilt angle, which will be described later using FIG. 4). In order to perform processing for the movement in a circular arc shape, as described above, correspondence data related to the tilt angle and the curvature may be stored in a memory, for example, and the microcomputer may perform the processing on the basis of the data. Further, the horizontal length on the screen of the mask image B is corrected depending on the amount of movement thereof in the lateral direction on the screen by panning, and the vertical length thereof on the screen of the mask image B is also corrected depending on the amount of movement thereof in the longitudinal direction on the screen by the above-mentioned position correction. For example, the length and the breadth of a mask image B14 next to a mask image B13 at the initial position on its right are more greatly corrected by approximately 10%, as compared with the mask image B13 (the amount of correction of the mask image B differs depending on the amount of movement thereof).

In FIG. 3 (c), the tilt angle is 40°. When the panning operation is performed, therefore, the mask object A is moved in a circular arc shape. In order to correspond to the movement in a circular arc shape, therefore, the position of the mask image B is corrected in the longitudinal direction on the screen depending on the amount of movement thereof in the lateral direction on the screen by the panning operation. Further, the horizontal length on the screen of the mask image B is corrected depending on the amount of movement thereof in the lateral direction on the screen by panning, and the vertical length on the screen of the mask image B is also corrected depending on the amount of movement thereof in the longitudinal direction on the screen by the above-mentioned position correction. For example, the length and the breadth of a mask image B24 next to a mask image B23 at the initial position on its right are more greatly corrected by approximately 15%, as compared with the mask image B23 (the amount of correction of the mask image B differs depending on the amount of movement thereof).

FIGS. 4 (a), 4 (b), and 4 (c) are explanatory views showing the correction of the position of the mask image B by the panning operation, and showing how the correction of the positions in the lateral direction (pan direction) and the longitudinal direction (tilt direction) of the mask image B differs depending on the difference in the tilt angle (in the drawings the amounts of panning movement of the camera device 1 are the same). Although the size of the mask image B is inherently corrected, the correction of the size is omitted in the drawings. As apparent from FIGS. 4 (a), 4 (b), and 4 (c), when the camera device 1 is moved in the pan direction, the positions of the mask image B in the lateral direction and the longitudinal direction are corrected depending on the tilt angle of the camera device 1 (in FIG. 3, described above, the correction of the position in the longitudinal direction and the correction of the size are illustrated for convenience of illustration). Even if the amounts of panning movement of the camera device 1 are the same, the position correction is made such that the larger the tilt angle of the camera device 1 is, the smaller the amount of movement in the lateral direction of the mask image B becomes.

Figure 5:
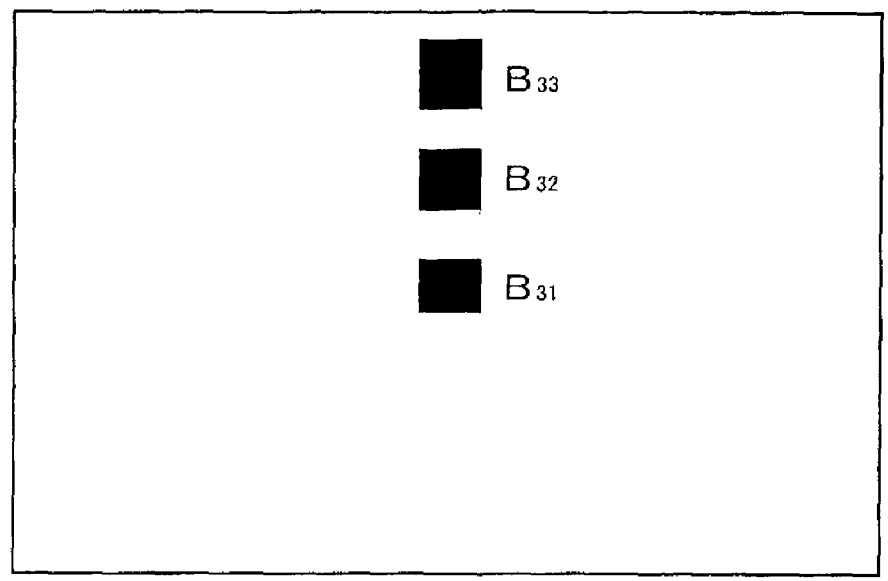
FIG. 5 is an explanatory view showing the contents of correction of the display of a mask image.

FIG. 5 is a diagram showing the change in the display of the mask image B in a case where a tilting operation is performed. The vertical length on the screen of the mask image B is corrected depending on the amount of movement thereof in the longitudinal direction on the screen by titling. A mask image B32 next to a mask image B31 at the initial position on its top is more greatly corrected by approximately 5% in the longitudinal direction, as compared with the mask image B31 (the amount of correction of the mask image B differs depending on the amount of movement thereof).

While the mask object A is moved on the screen (during a panning/tilting operation), processing for moving the mask image B by the amount of movement thereof is performed. During the movement, not only processing for moving the mask image B but also correction for increasing the size of the mask image B forward in the direction of movement is performed. Further, the amount of correction of the mask image B is adjusted depending on the movement speed thereof. That is, the amount of correction for increasing the size of the mask image B forward in the direction of movement in a case where the movement speed is high is made larger than the amount of correction for increasing the size of the mask image B forward in the direction of movement in a case where the movement speed is low. Consequently, it is possible to prevent situations where the mask object A seems it protruded forward in the direction of movement from the mask image B during the movement (during the panning/tilting operation) on the screen of the mask object A. Here, in stopping the mask image B by panning/tilting, the mask object A may seem it protruded backward in the direction of movement from the mask image B. Therefore, the correction may be made such that the size of the mask image B is also increased backward in the direction of movement. Also in this case, the amount of correction of the mask image B is adjusted depending on the movement speed thereof. The movement direction and the movement speed of the mask image B can be judged utilizing a directional component and a speed component of a pan/tilt command.

Figure 6:
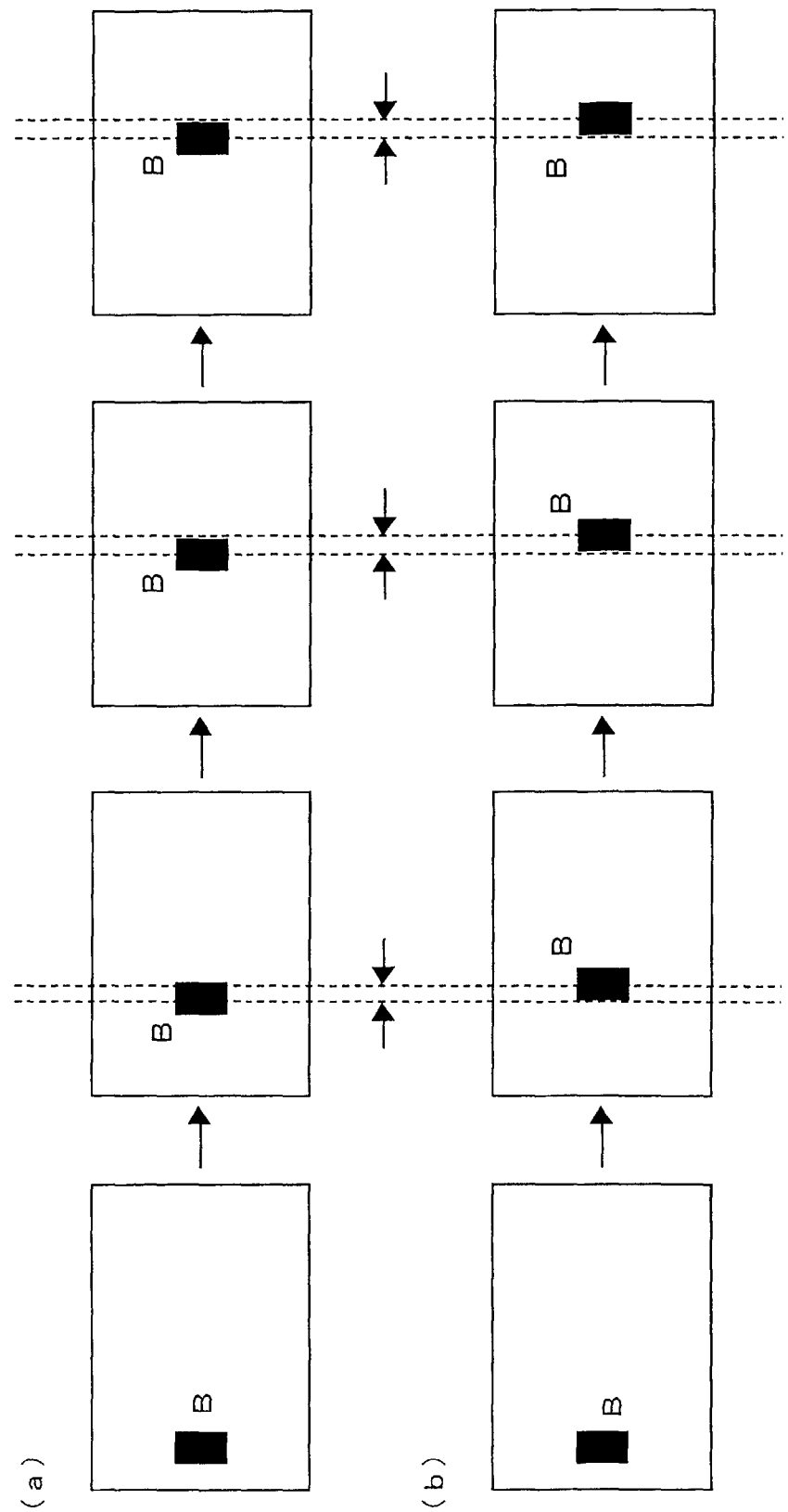
FIG. 6 (*a*) is an explanatory view showing a case where the position during movement of a mask image is not corrected.

While the mask object A is moved on the screen (during the panning/tilting operation), as described, processing for moving the mask image B by the amount of movement thereof is performed. While the mask image B is moved by an amount of movement of the camera device 1 (an amount of movement obtained by processing for calculating the position of the mask image B), however, the camera device 1 is moved during the processing for calculating the position of the mask image B. Accordingly, the mask object A may seem it protruded forward in the direction of movement from the mask image B. FIG. 6 (a) illustrates a case where the position correction of the mask image B is not performed during the movement thereof, and FIG. 6 (b) illustrates a case where the position correction of the mask image B is performed during the movement thereof. That is, in FIG. 6 (b) the position of the mask image B is also corrected such that the delay in the movement of the mask image B by the above-mentioned calculation processing is solved. For example, the position of the mask image B is set to a position obtained by adding several dots to the position obtained by the processing for calculating the position of the mask image B in the direction of movement. Also with respect to the correction of the position of the mask image B, the amount of correction of the mask image B may be adjusted depending on the movement speed thereof.

Furthermore, there is a case where the camera device 1 enters a state where it is reversed in the tilt direction and is also reversed in the pan direction from an area where the initial position of the mask image B is set to image an area including the original mask object A. In such a case, the position of the mask image B may, in some cases, be shifted from the position of the mask object A depending on a machine error in the imaging direction control device (panning/tilting mechanism) 1b, for example. When such a reversing operation is performed, the size of the mask image B is greatly corrected, to prevent the mask object A from seeming it protruded from the mask image B due to the shift in the position.

Here, the correction of the size of the mask image B is arranged.

① The correction of the size of the mask image B dependent on the amount of movement thereof from the set position If the mask image B is moved in the pan direction, the horizontal length (in the pan direction) of the mask image B is corrected depending on the amount of movement thereof.

If the mask image B is moved in the tilt direction, the vertical length (in the tilt direction) of the mask image B is corrected depending on the amount of movement thereof.

② The correction of the size of the mask image B at the time of panning the camera device 1 depending on the difference in the tilt angle If the camera device 1 is moved in the pan direction at a certain tilt position, the horizontal/vertical length of the mask image B is corrected depending on the amount of movement thereof and the tilt position.

③ The correction of the size of the mask image B during the movement of the camera device 1

When the camera device 1 is moved in the pan direction, the size of the mask image B is corrected in the lateral direction of movement depending on the movement speed.

When the camera device 1 is moved in the tilt direction, the size of the mask image B is corrected in the longitudinal direction of movement depending on the movement speed.

④ The correction of the size of the mask image B in a case where the camera device 1 is reversed over the vertical position in the tilt direction The length and the breadth of the mask image B appearing when the camera device 1 is reversed over the vertical position in the tilt direction and is moved in the pan direction are corrected. The degree of correction depends on the degree of the machine error or the like in the panning/tilting mechanism.

The final horizontal length of the mask image B is taken as the horizontal length at the time of setting of the mask image B plus the sum of corrected values (corrected values in the foregoing items ① to ④), and the final vertical length of the mask image B is taken as the vertical length at the time of setting of the mask image B plus the sum of corrected values (corrected values in the foregoing items ① to ④). In this case, the size of the mask image B is corrected not at several percent of the original size of the mask image B but at a ratio corresponding to the amount of movement thereof. For example, the mask image B is increased by 10 pixels in the longitudinal direction in an amount of movement D, while being increased by 20 pixels in the longitudinal direction in an amount of movement 2D. Consequently, the correction is not affected by the original size of the mask image B. When the original size of the mask image B is small, the mask image B may be corrected not on the basis of the size thereof but at a ratio corresponding to the amount of movement thereof.

As described in the foregoing, the mask image B is corrected on the basis of the amount of movement of the mask image B. However, the amount of movement of the mask image B is synonymous with the amount of fluctuations in the pan/tilt position of the camera device 1. That is, the mask image B is corrected on the basis of the amount of fluctuations in the pan/tilt position of the camera device 1. Even if the amounts of panning movement of the camera device 1 are the same, as described above, however, the position correction is made such that the larger the tilt angle of the camera device 1 is, the smaller the amount of movement in the lateral direction of the mask image B becomes. Although there are correction of the size of the mask image B based on the amount of movement from the initial position of the mask image B after the position correction and correction of the size of the mask image B based on the amount of movement from the initial position of the mask image B before the position correction, the present invention includes both the corrections. According to the above-mentioned video camera system, situations where the mask object existing within the range of imaging with the camera device seems it protruded from the mask image can be avoided to the utmost.

In the present embodiment, when a maximum of four mask images B, for example, can be set within one range of imaging with the camera device 1. In a case where four mask images B are thus set, when the direction of imaging is changed by the panning/tilting mechanism, the positions where the four mask images B are displayed are changed. Further, a maximum of four mask images B can be also similarly set within a range of imaging with the camera device 1 in another direction. A maximum of eight mask images B can be set as a whole.

The initialization of the mask image B can be performed by operating the operation unit 3 in a state where the mask object A exists within the range of imaging with the camera device 1. Operation information (a command) from the operation unit 3 is fed to the microcomputer in the camera device 1. Here, when the mask image B is initialized, its priority is set. For example, mask images B1 to B8 assigned eight priorities 1 to 8 are previously prepared. When the degree of importance of a certain mask object existing within a range of imaging with the camera device 1 is the third, an operator selects the mask image B3 assigned the priority 3, to perform initialization for masking the above-mentioned mask object. As described above, four or more mask images cannot be set within one range of imaging with the camera device 1. The microcomputer in the camera device 1 manages position information related to the mask image B as well as its priority.

Figure 7:
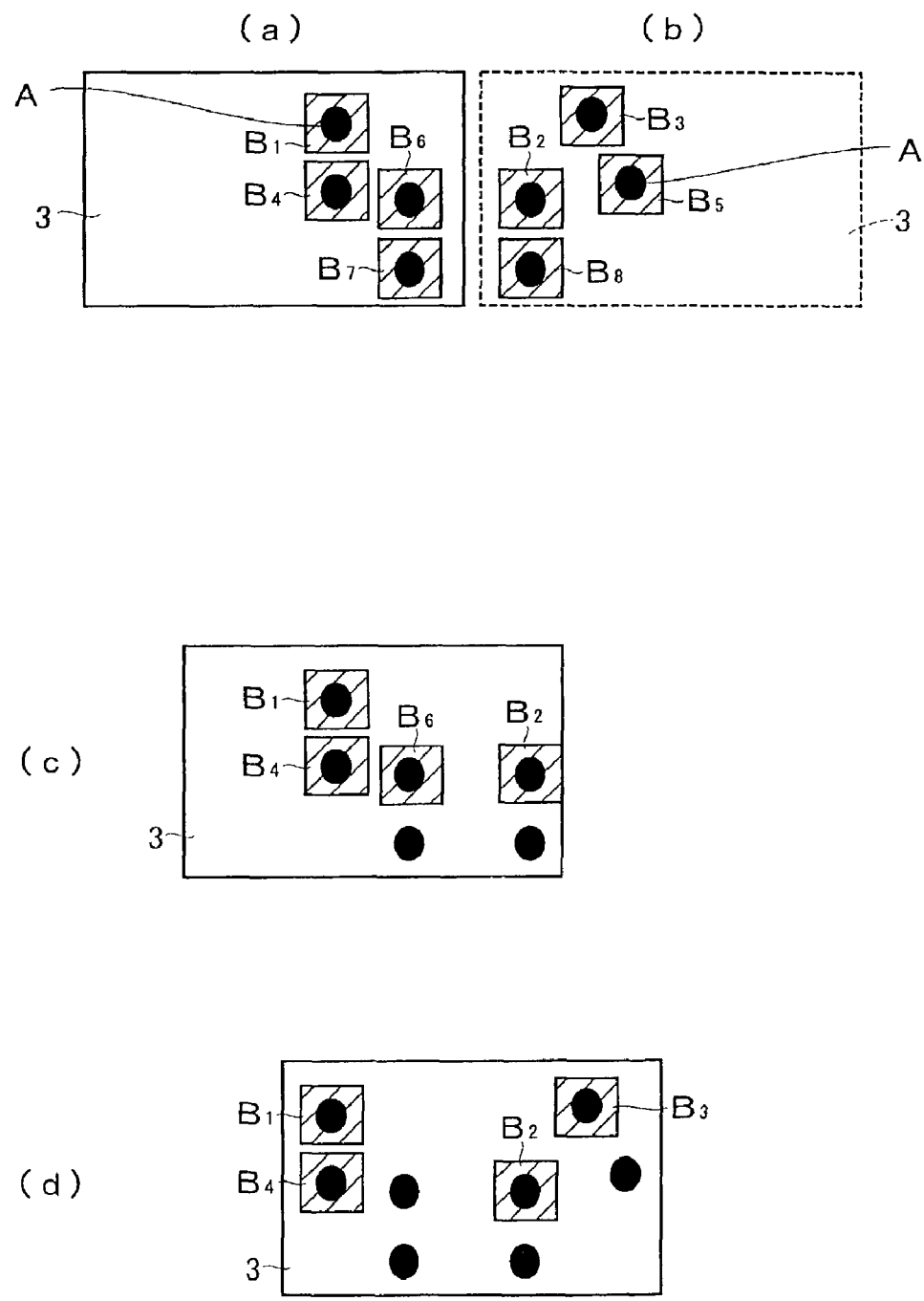
FIGS. 7 (*a*), 7 (*b*), and 7 (*c*) are explanatory views showing a state where a mask image is displayed within a range of imaging with a camera device.

FIG. 7 (*a*) illustrates a case where four mask images B1, B4, B6, and B7 are set in a first camera direction, and FIG. 7 (*b*) illustrates a case where four mask images B2, B3, B5, and B8 are set in a second camera direction. A subscript of B indicates a priority assigned to the mask image. FIG. 7 (*c*) illustrates a state where six mask objects A enter a range of imaging with the camera device 1. The maximum number of mask images B which can be superimposed is four. In such a case, therefore, only the mask images B1, B2, B4, and B6 assigned the priorities 1, 2, 4, and 6 are displayed. FIG. 7 (*d*) illustrates a state where all the eight mask objects A enter the range of imaging with the camera device 1 by a panning operation. The maximum number of mask images B which can be superimposed is four. In such a case, therefore, only the mask images B1 to B4 assigned the priorities 1 to 4 are displayed.

Figure 8:
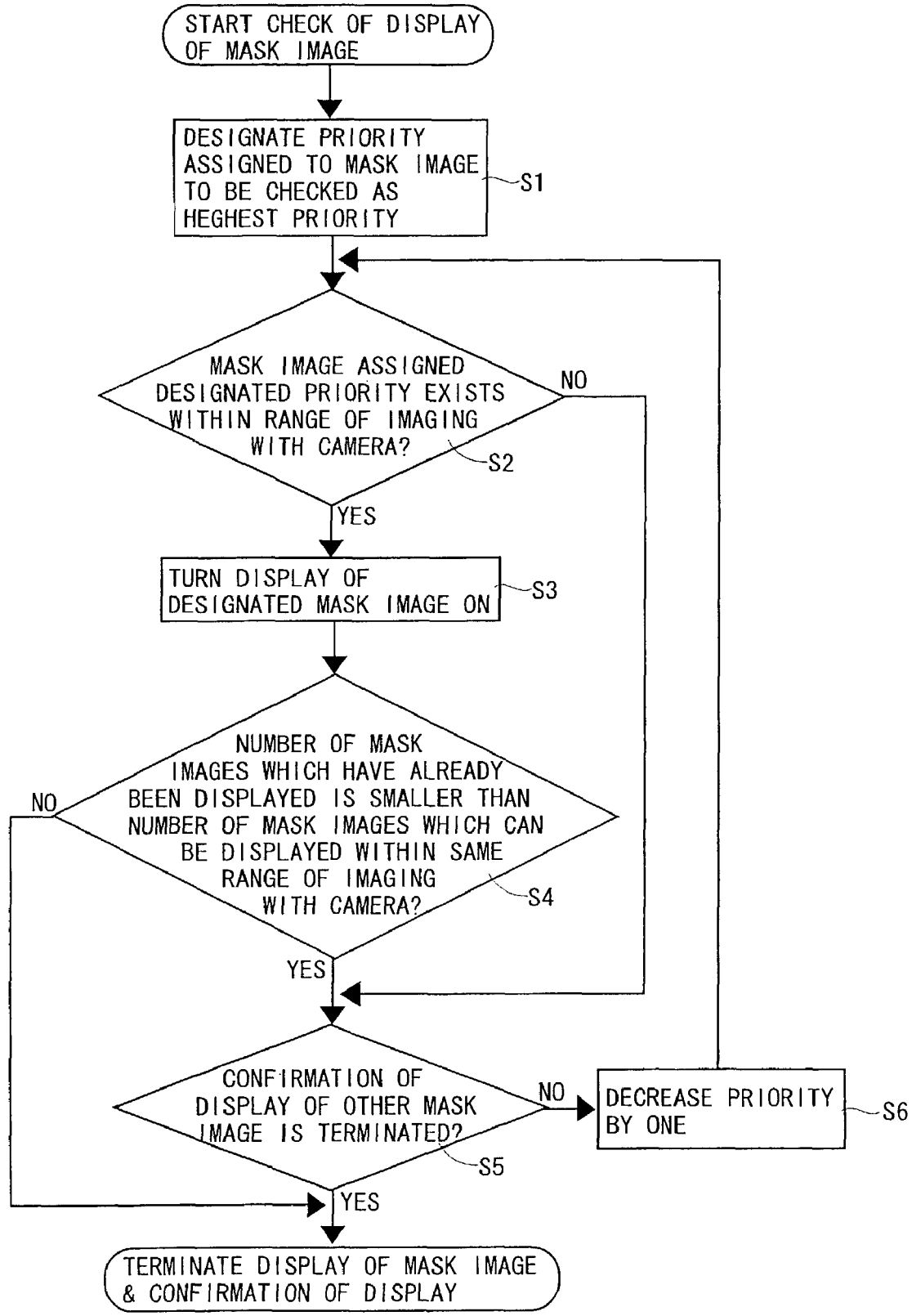
FIG. 8 is a flow chart showing processing for displaying a mask image.
Figure 9:
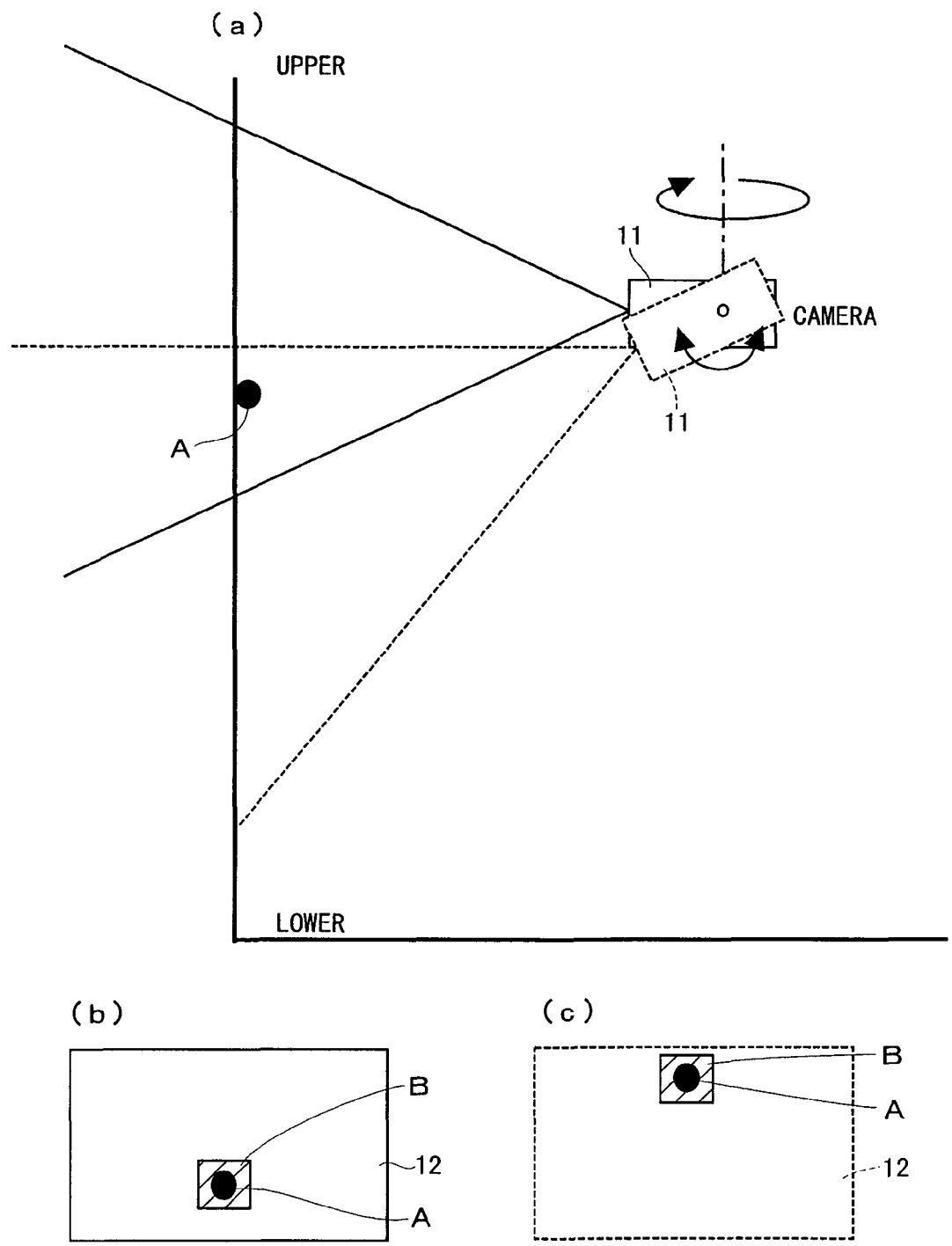
FIG. 9 (*a*) is an explanatory view showing the direction of imaging with a camera device according to the prior art.
Figure 10:
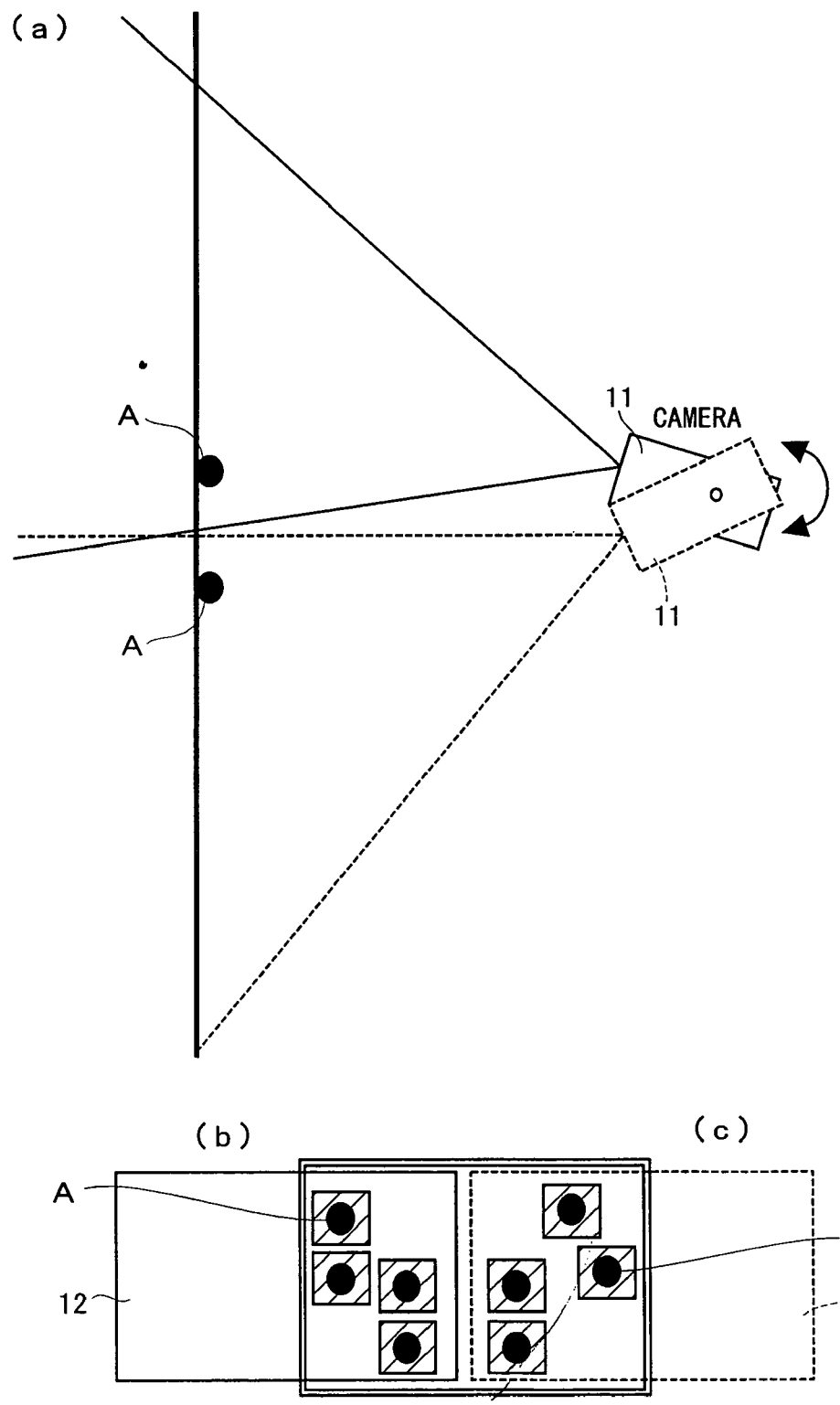
FIG. 10(*a*) is an explanatory view showing that a maximum of four mask images can be set.

FIG. 8 is a flow chart showing mask image display processing performed by the microcomputer in the camera device 1. First, a priority assigned to a mask image to be checked is designated as the highest priority (step S1). It is then judged whether or not the mask image assigned the designated priority exists within a range of imaging with the camera device 1 (step S2). The judgment is made by calculation processing on the basis of information related to the initial position of the mask image and information representing the pan/tilt position of the camera main body 1*a*. When the mask image does not exist, it is judged whether or not the confirmation of the display of the other mask image is terminated (step S5). If the confirmation has not been terminated yet, the priority is decreased by one (step S6), after which the program is returned to the step S2.

When it is judged in the step S2 that the answer is in the affirmative, processing for turning the display of the designated mask image on is performed (step S3). That is, processing for superimposing the designated mask image on an imaged video is performed. It is then judged whether or not the number of mask images which have already been displayed is smaller than the number of mask images which can be displayed within the same range of imaging with the camera device (four in the present embodiment) (step S4). When the answer is in the negative (the number is four or more), further mask display cannot be performed. Accordingly, the processing is terminated. On the other hand, when the answer is in the affirmative in the step S4, it is judged whether or not the confirmation of the display of the other mask image is terminated (step S5). If the confirmation has not been terminated yet, the priority is decreased by one (step S6), after which the program is returned to the step S2. If the confirmation is terminated, the processing is terminated. Thereafter, a panning/tilting operation is performed in the camera main body 1*a*. When the camera direction is changed, the processing shown in the foregoing flow chart may be performed again.

Although in the above-mentioned example, a case where the number of mask images which can be set is a maximum of eight, and the number of mask images which can be displayed within one range of imaging with the camera device 1 is four is illustrated, the present invention is not limited to the same. Further, the flow chart shown in FIG. 8 showing the processing for displaying the mask images based on the priorities is only an example. The processing for displaying the mask images based on the priorities may be performed by another algorithm. According to the above-mentioned video camera system, in a case where the number of mask images which can be set is thus restricted, the mask objects whose degree of importance is high can be masked by priority on the basis of the priorities set in the mask images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera system comprising:
    a camera device for acquiring video images;
    an imaging direction control device configured to carry out panning/tilting control of the camera device;
    a circuit configured to superimpose a mask image on an arbitrary area set at an initial position within a range of imaging with the camera device on a video monitor, said initial position lies entirely within a screen of the video monitor;
    a processor configured to: receive a pan/tilt command to control the imaging direction control device; control the movement of the mask image based on the pan/tilt command; and correct the size of the mask image both forward and backward or either forward or backward in the direction of movement with the amount of correction of said mask image being adjusted depending on the movement speed thereof and the amount of correction increases as the movement speed increases.

2. A video camera system comprising:
    a camera device for acquiring video images;
    an imaging direction control device configured to carry out panning/tilting control of the camera device;
    a circuit configured to superimpose a mask image on an arbitrary area set at an initial position within a range of imaging with the camera device on a video monitor, said initial position lies entirely within a screen of the video monitor;
    a processor configured to: receive a pan/tilt command to control the imaging direction control device; calculate the amount of movement of the mask image based on the pan/tilt command; control the position of the mask image based on the calculated amount of movement; and correct the position of the mask image in the direction of movement when the camera device is also moved during processing for calculating the amount of movement of the mask image with the amount of correction of said mask image being adjusted depending on the movement speed thereof and the amount of correction increases as the movement speed increases.

3. A video camera system comprising:
a camera device for acquiring video images;
an imaging direction control device configured to carry out panning/tilting control of the camera device;
a circuit configured to superimpose a mask image on an arbitrary area set at an initial position within a range of imaging with the camera device on a video monitor, said initial position lies entirely within a screen of the video monitor;
a processor configured to: receive a pan/tilt command to control the imaging direction control device; control the movement of the mask image based on the pan/tilt command; and correct the size of the mask image greater than the original size of the image when in a state where the camera device images an area including the original mask object by being reversed in the tilt direction and also reversed in the pan direction from an area where the initial position of the mask image is set.

4. A video camera system capable of carrying out panning/tilting control of a camera device, capable of displaying a video imaged by the camera device on a monitor as well as superimposing a maximum of n (n is a natural number of one or more) mask images within a range of imaging with the camera device, and capable of similarly superimposing a maximum of n mask images even within a range of imaging with the camera device at the time of imaging in another direction,
the video camera system comprising:
a processor configured to set priorities in the mask images; and
said processor further configured to select in a case where mask object areas whose number exceeds n exist within the range of imaging with the camera device, n mask images in conformity with said priorities.

5. A video camera system capable of carrying out panning/tilting control of a camera device, capable of displaying a video imaged by the camera device on a monitor as well as superimposing a maximum of n (n is a natural number of one or more) mask images within a range of imaging with the camera device, and capable of similarly superimposing a maximum of n mask images even within a range of imaging with the camera device at the time of imaging in another direction,
the video camera system comprising:
a processor configured to set priorities in the mask images; and
wherein the mask images are subjected to display judgment processing in the order of descending priorities within the range of imaging with the camera device, to perform display processing with respect to the mask image to be displayed and not further perform display processing with respect to the mask image when the number of displayed mask images is n.

* * * * *